United States Patent
Miller et al.

(10) Patent No.: US 10,917,735 B2
(45) Date of Patent: Feb. 9, 2021

(54) HEAD-RELATED TRANSFER FUNCTION PERSONALIZATION USING SIMULATION

(71) Applicant: Facebook Technologies, LLC, Menlo Park, CA (US)

(72) Inventors: Antonio John Miller, Woodinville, WA (US); Ravish Mehra, Tacoma, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/390,918

(22) Filed: Apr. 22, 2019

(65) Prior Publication Data

US 2019/0349702 A1 Nov. 14, 2019

Related U.S. Application Data

(60) Provisional application No. 62/670,628, filed on May 11, 2018.

(51) Int. Cl.
| | |
|---|---|
| *H04S 7/00* | (2006.01) |
| *G06T 7/60* | (2017.01) |
| *H04S 3/00* | (2006.01) |
| *G06T 7/50* | (2017.01) |

(52) U.S. Cl.
CPC ............... *H04S 7/303* (2013.01); *G06T 7/50* (2017.01); *G06T 7/60* (2013.01); *H04S 3/008* (2013.01); *H04S 2400/01* (2013.01); *H04S 2420/01* (2013.01)

(58) Field of Classification Search
CPC ...... H04S 7/303; H04S 3/008; H04S 2400/01; H04S 2420/01; G06T 7/50; G06T 7/60

USPC .................................... 381/1, 124, 303, 365
See application file for complete search history.

(56) References Cited

U.S. PATENT DOCUMENTS

| | | | |
|---|---|---|---|
| 9,906,884 B2 | 2/2018 | Meshram et al. | |
| 2012/0183161 A1 | 7/2012 | Agevik et al. | |
| 2017/0272890 A1 | 9/2017 | Oh et al. | |
| 2018/0034867 A1* | 2/2018 | Zahn | H04L 51/046 |
| 2018/0367937 A1 | 12/2018 | Asada et al. | |
| 2019/0087972 A1* | 3/2019 | Huttunen | G06T 19/20 |

FOREIGN PATENT DOCUMENTS

WO WO 2017/047309 A1 3/2017

OTHER PUBLICATIONS

Huttunen, 2014, Rapid generation of personalized HRTFs.*
Krinninger, 2016, One-Shot 3D Body-Measurement.*
(Continued)

*Primary Examiner* — William A Jerez Lora
(74) *Attorney, Agent, or Firm* — Fenwick & West LLP

(57) ABSTRACT

Embodiments relate to obtaining head-related transfer function (HRTF) through performing simulation using images of a user's head. The geometry of the user's head is determined based in part on one or more images of the user's head. The simulation of sound propagation from an audio source to the user's head is performed based on the generated geometry. The geometry may be represented in a three-dimensional meshes or principal component analysis (PCA)-based where the user's head is represented as a combination of representative three-dimensional shapes of test subjects' heads.

16 Claims, 6 Drawing Sheets

(56) References Cited

OTHER PUBLICATIONS

Meshram, A. et al. "P-HRTF: Efficient Personalized HRTF Computation for High-Fidelity Spatial Sound." 2014 IEEE International Symposium on Mixed and Augmented Reality (ISMAR), Sep. 10-12, 2014, pp. 53-61.

PCT International Search Report and Written Opinion, PCT Application No. PCT/US2019/031794, dated Jul. 9, 2019, 15 pages.

Schoning, J. et al. "Structure from Motion by Artificial Neural Networks." 2017 Scandinavian Conference on Image Analysis, May 19, 2017, pp. 146-158.

* cited by examiner

HEAD-RELATED TRANSFER FUNCTION PERSONALIZATION USING SIMULATION

CROSS-REFERENCE TO RELATED APPLICATION

The present application claims the benefit of U.S. Patent Application 62/670,628 filed on May 11, 2018, which is hereby incorporated by reference in its entirety.

BACKGROUND

This disclosure relates generally to stereophony and specifically to determining head-related transfer function (HRTF) through simulation using depth information and/or principal component analysis (PCA).

A sound perceived at two ears can be different, depending on direction and location of a sound source with respect to each ear as well as on the surroundings of a room in which the sound is perceived. Humans can determine a location of the sound source by comparing the sound perceived at each ear. In a "surround sound" system, a plurality of speakers reproduce the directional aspects of sound using HRTFs. An HRTF characterizes how an ear receives a sound from a point in space. The HRTF for a particular source location relative to a person is unique to each ear of the person (and is unique to the person) due to the person's anatomy that affects the sound as it travels to the person's ears. As sound strikes the person, the size and shape of head, ears, ear canal, density of the head, size and shape of nasal and oral cavities transform the sound and affects how the sound is perceived by the user.

Conventionally, HRTFs are determined in a sound dampening chamber for many different source locations (e.g., typically more than a 100 speakers) relative to a person. The determined HRTFs may then be used to generate a "surround sound" experience for the person. Moreover, to reduce error, it is common to determine multiple HRTFs for each speaker location (i.e., each speaker is generating a plurality of discrete sounds). Accordingly, for high quality surround sound, it takes a relatively long time (e.g., more than an hour) to determine the HRTFs as there are multiple HRTFs determined for many different speaker locations. Additionally, the infrastructure for measuring HRTFs sufficient for quality surround sound is rather complex (e.g., sound dampening chamber, one or more speaker arrays, etc.). Accordingly, conventional approaches for obtaining HRTFs are inefficient in terms of hardware resources and/or time needed.

SUMMARY

Embodiments relate to obtaining head-related transfer function (HRTF) through performing simulation using images of a user's head. The geometry of the user's head is determined based in part on one or more images of the user's head. The simulation of sound propagation from an audio source to the user's head is performed based on the generated geometry. The geometry may be represented in three-dimensional meshes or principal component analysis (PCA)-based geometry where the user's head is represented as a combination of representative three-dimensional shapes of test subjects' heads.

In one embodiment, a PCA-model for generating the PCA-based geometry is obtained by determining PCA-based geometries of the test subjects' head images based on an initial PCA model. Then, simulation is performed on the PCA-based geometries to determine simulated HRTFs of the test subjects. The differences between the simulated HRTFs and the measured HRTFs is determined. Based on the determined differences, an updated PCA model is generated by modifying the initial PCA model or by updating one or more intermediate PCA models derived from the initial PCA model. The updated PCA model is determined as the PCA model for representing the user's head when differences between the measured HRTFs and simulated HRTFs based on PCA-based geometries of the updated PCA model are below a threshold

DETAILED DESCRIPTION

Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

An artificial reality system may operate in two modes: a calibration mode and a presentation mode. In the calibration mode, HRTF calibration is performed. A HRTF characterizes how an ear (e.g., ear canal) of a user receives a sound from sound sources at particular positions relative to the ear. In one embodiment, a system may perform HRTF simulation using depth information of the user's head determined using an imaging device (e.g., HMD with DCA, mobile device with a camera). In another embodiment, the system may perform HRTF simulation based on PCA-based geometries of the user's head.

In the presentation mode, the system presents sound content through an audio output device (e.g., speakers, headphones) according to the audio characterization configuration determined from HRTF calibration. Based on the HRTF calibration, surround sound configuration is determined and provided to the user through the audio output device. The sound content may be synced to visual content that is presented simultaneously through the HMD.

System Environment for Determining HRTFs

Figure 1:
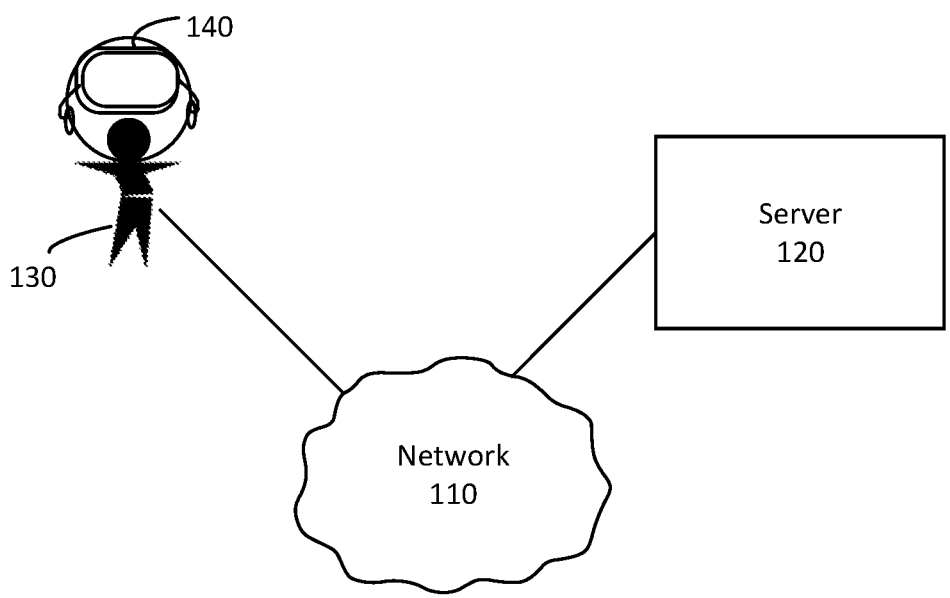
FIG. 1 is a schematic diagram of a system using images of a user to determine the user's HRTF, in accordance with an embodiment.

FIG. 1 is a schematic diagram of a system 100 using images of a user 130 to determine the user's HRTF, in accordance with an embodiment. The user 130 wears a HMD 140 that is connected to a server 120 through a network 110. Images of the user's 130 head are captured using an imaging device on a HMD 140. A user directs the HMD 140 such that the imaging device is pointed at the user's head, and the imaging device captures a plurality of images of the user's head. Alternatively, the images are collected using an imaging device on a mobile phone (not shown in FIG. 1).

The images of the user's 130 head are sent to a server 120 through the network 110. The network 110 may be any suitable communications network for data transmission. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI express Advanced Switching, etc. In some example embodiments, the entities use custom and/or dedicated data communications technologies instead of, or in addition to, the ones described above.

The server 120 receives and uses the plurality of images to determine the HRTF customized for the user 130. For this purpose, the server 120 generates a geometry of the user's 130 head that is used to perform a simulation, as described below in detail with reference to FIG. 3. Based on the determined HRTF, a surround sound configuration customized for the user 130 may be sent to the HMD 140 through the network 110 to provide virtual surround sound to the user 130.

Figure 2:
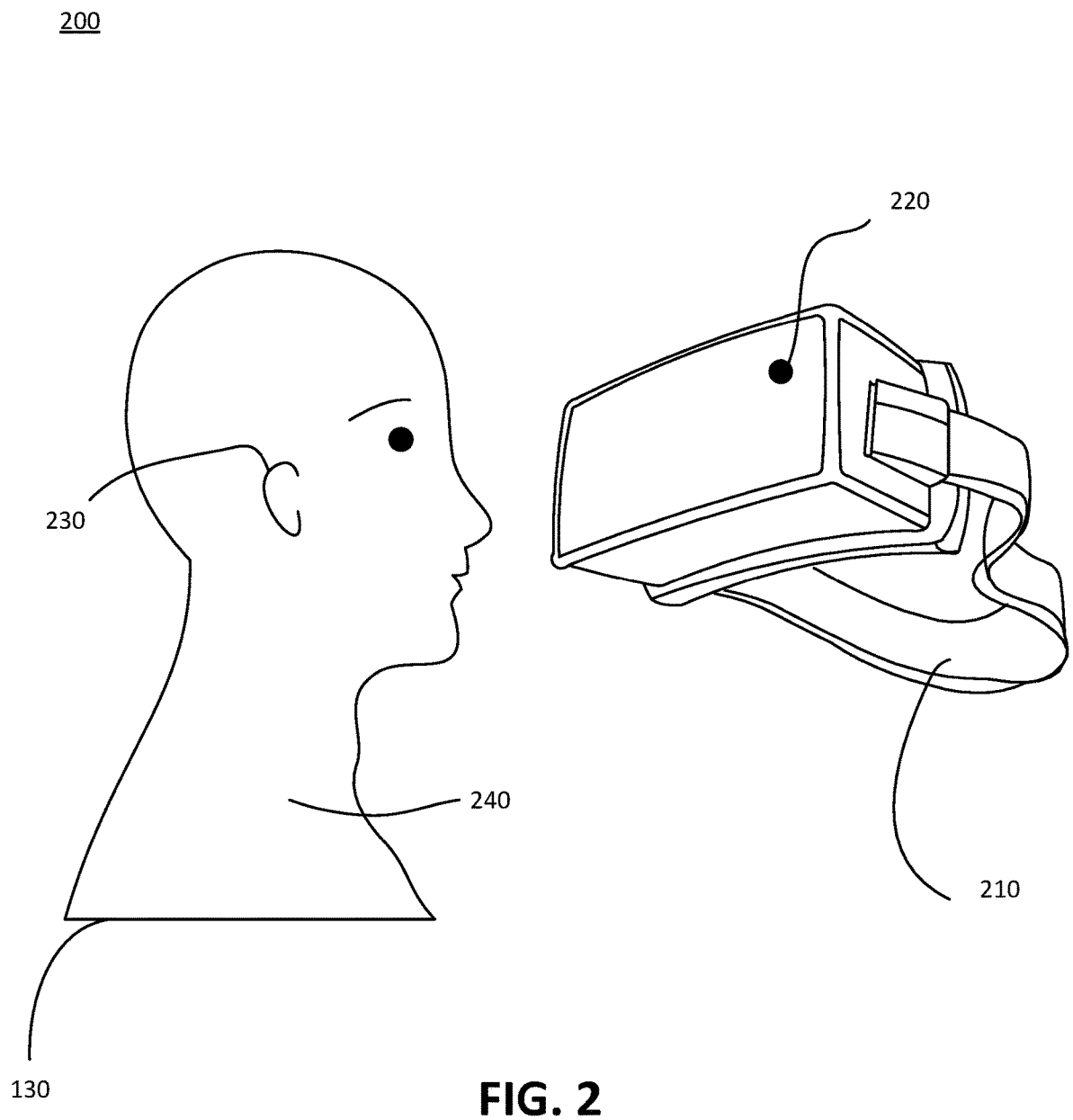
FIG. 2 is an example view of an HMD capturing an image of the user's head, in accordance with an embodiment.

FIG. 2 is an example view of an HMD 210 capturing an image of the user's head, in accordance with an embodiment. The HMD 210 is a head-mounted display that presents content to a user comprising virtual and/or augmented views of a physical, real-world environment with computer-generated elements (e.g., two dimensional (2D) or three dimensional (3D) images, 2D or 3D video, sound, etc.).

The HMD 210 includes a depth camera assembly (DCA) 220 that captures images of the user 130 including the user's head. The captured image may be a depth image or a color image (e.g. RGB image). The depth image may be captured using one or a combination of the following techniques: stereo vision, photometric stereo, time-of-flight (ToF), and structured light (SL). The DCA 220 can compute the depth information from the depth image, or send the depth image to the server 120 to extract the depth information.

To capture the user's head more accurately, the user 130 directs the HMD 210 such that the DCA 220 is pointed towards the user's 130 from a plurality of positions. The user 130 may hold the HMD 210 at different angles and/or distances relative to the user 130. For example, the user 130 may hold the HMD 210 at arm's length directly in front of the user's 130 face and use the DCA 220 to capture an image of the user's 130 face. The user 130 may also hold the HMD 210 at a distance shorter than arm's length with the DCA 220 pointed towards the side of the user's 130 head to capture an image of the user's 130 ear 230 and/or shoulder 240. The HMD 210 may run a feature recognition software and capture an image automatically when features of interest (e.g., ear, shoulder) are recognized or receive an input from the user to capture the image.

In another embodiment, the user 130 uses an imaging device of a mobile device to capture a plurality of images of the user's 130 head. The mobile device may have an application that has a graphical user interface (GUI) that guides the user 130 to capture the plurality of images of the user's 130 head from specific angles and/or distances relative to the user 130. For example, the GUI may request a front-facing image of the user's 130 face, an image of the user's 130 right ear, and an image of the user's 130 left ear.

Example Architecture of Server for Determining HRTFs

Figure 3:
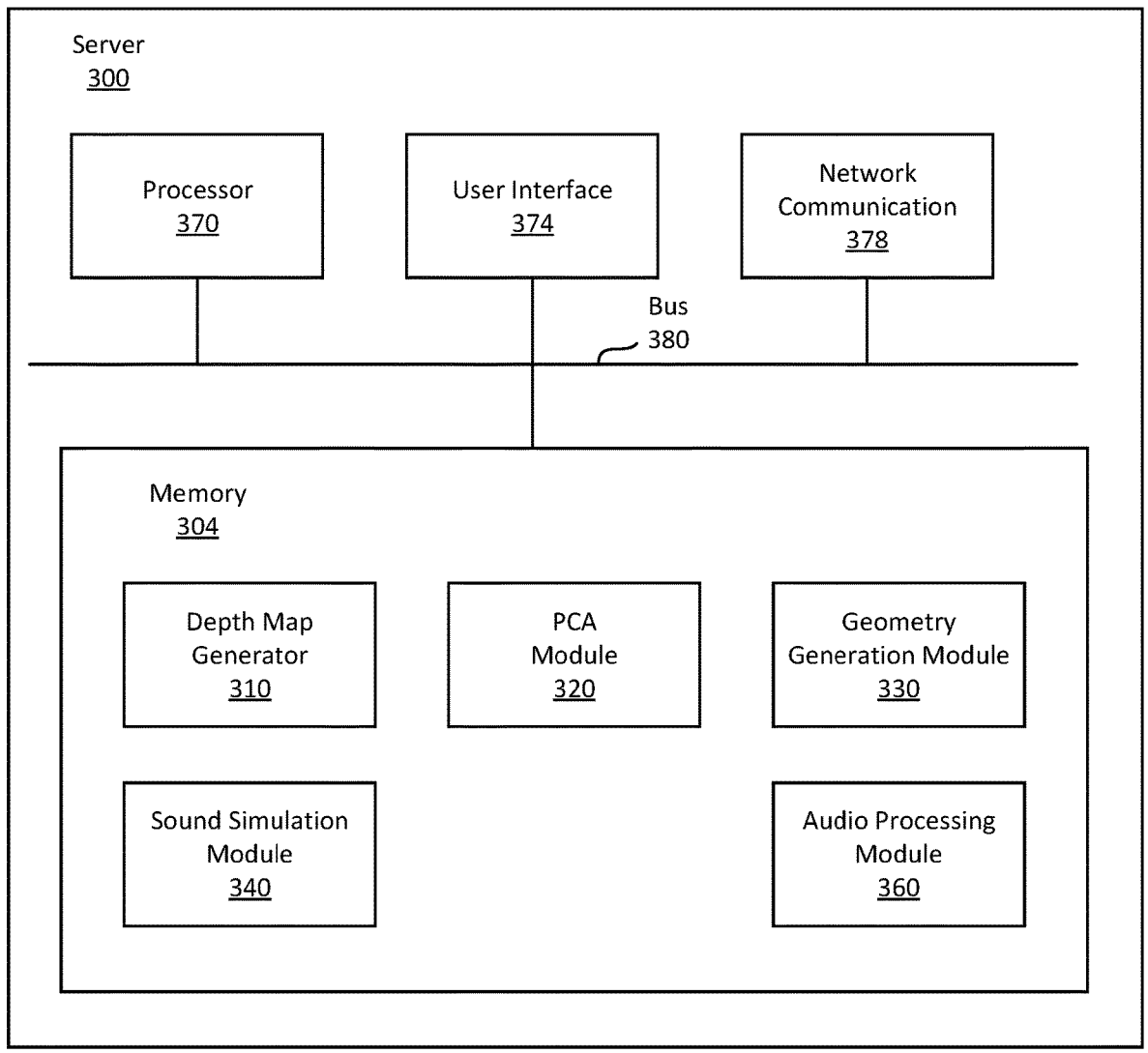
FIG. 3 is a block diagram of the server for determining the user's HRTF, in accordance with an embodiment.

FIG. 3 is a block diagram of the server 300 for determining the user's HRTF, in accordance with an embodiment. The server 300 may include, among other components, a processor 370, a user interface 374, a network communication module 378, a memory 304 and a bus 380 connecting these components. The server 300 may include components not illustrated in FIG. 3 such as a power source, a display device or a speaker.

The processor 370 is a hardware component that executes instructions to perform various operations. Although a single processor 370 is illustrated in FIG. 3, two or more processors may be used in the server 300 for expanded computing capacity.

The user interface 374 is software, hardware, firmware or a combination thereof for interfacing with a user of the server 300. The user interface 374 may include input devices such as keyboard and pointing devices (e.g., mouse).

The network communication module 378 is hardware or hardware in combination with software and firmware that enables the server 300 to communicate with the HMD 210 or other sources of the user's image via the network 110. The network communication module 378 may be embodied, for example, as a network card.

The memory 304 is a non-transient medium for storing software modules and various data. The memory 304 may include, among other modules, a depth map generator 310, a principal component analysis (PCA) module 320, a geometry generation module 330, a sound simulation module 340, and an audio processing module 360. The functions can be distributed among the modules and/or different entities in a different manner than is described here. In some embodiments, some or all the functionality of the modules in the memory 304 may be provided by an HMD (e.g., HMD 210).

The depth map generator 310 is a software module that receives the images of a user's head and generates a depth map from the plurality of images. The depth map generator 310 may extract information about the user's head from the plurality of images received from a DCA of an HMD (e.g., DCA 220) or an imaging device of a mobile device. The information may include depth information which is used to determine the positions of features on the user's head. The depth map generator 310 may create a depth map of the user's head and determine the relative position of the user's features. The depth map indicates the position or spatial relationship between the features of interest from the images of the user's head. For example, the depth map may indicate the distance between the user's left ear and right ear or the position of the user's ears relative to other features such as eyes and shoulders.

The PCA module 320 determines a PCA model based on head images of human test subjects and measured HRTFs of the test subjects. For this purpose, the PCA module 320 receives the test subjects' head images (or portions thereof) and measured HRTFs of the test subjects, for example, from a database. Based on the received head images of the test subjects (e.g., 500-1000 test subjects), the PCA module 320 performs principal component analysis (PCA) which uses orthogonal transformation to determine a set of linearly uncorrelated principal components. For example, the ear shapes of the test subjects may be the focus of the PCA in which a random shape of an ear is represented as a combination of principal ear shapes (e.g., 5 to 10 ear shapes). The details of determining the PCA model is discussed below with respect to FIG. 6B. The result of the PCA is then provided to geometry generation module 330. Although PCA module 320 is described as being executed in the server 300 for the sake of convenience, the PCA module 320 may be executed on a separate computing device. In such case, the result of the PCA is processed and provided to the geometry generation module 330 for processing a user's PCA-based head geometry.

The geometry generation module 330 determines a geometry of a user's head based on the depth map generated by the depth map generator 310. The determined geometry may be a 3-dimensional mesh representation of the user's head describing, for example, the position of features of the user's head such as eyes, ears, neck, and shoulders. Alternatively, the determined geometry may be a PCA-based geometry of the user's head where the user's head or a feature of the user's head (e.g., ear shape) is represented as a linear combination of the principal components multiplied with corresponding PCA coefficients.

The sound simulation module 340 is a software module that uses a computerized model to simulate propagation of sound to the user's head. The sound simulation module 340 receives the geometry of the user's head from the geometry generation module 330. Based in part on the geometry of the user's head, the sound simulation module 340 performs a simulation that includes determining how sound is propagated from different locations to the user's ears to determine the user's HRTF, as described in detail below with reference to FIG. 4.

The audio processing module 360 determines surround sound configuration of the user based in part on the HRTF of the user generated at the sound simulation module 340. Using the HRTF, the audio processing module 360 processes sound signals to be reproduced at the user's HMD 210 and sends the processed sound signal to the HMD 210. Alternatively, the sound signal is not processed at the server 300 but sent to the HMD 210 in a raw form. The HMD 210 receives the user's HRTF and executes an audio signal processing algorithm based on the HRTF to produce surround virtual sound to the user.

HRTF Determination Using Three-Dimensional Mesh Model

Figure 4:
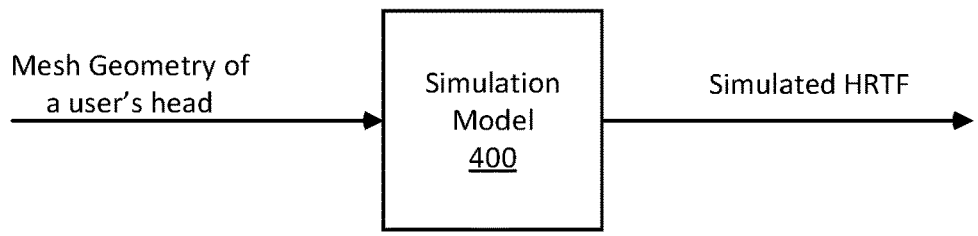
FIG. 4 is a conceptual diagram that illustrates simulating HRTFs based on three-dimensional mesh geometry of the user's head, in accordance with an embodiment.
Figure 5:
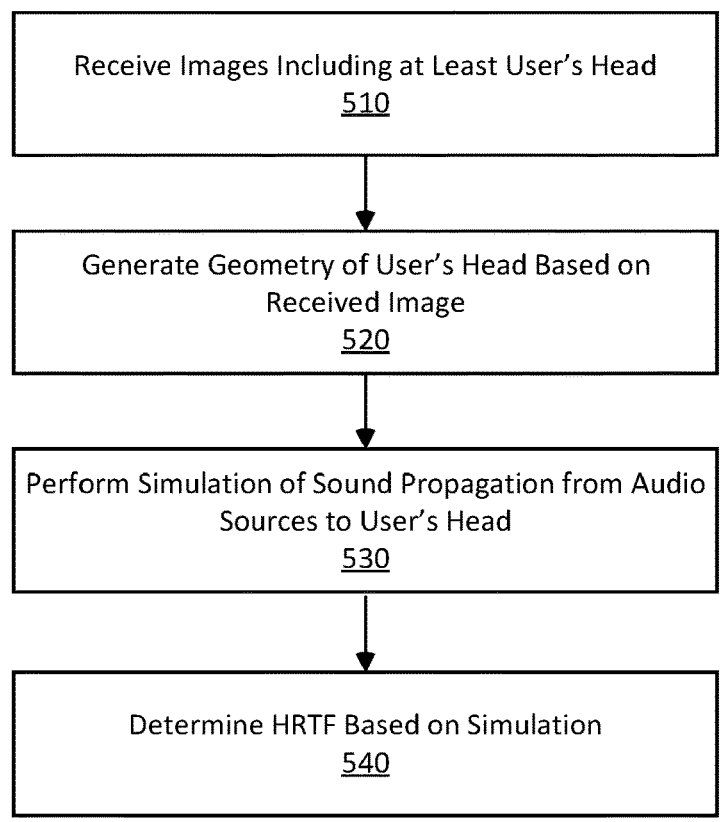
FIG. 5 is a flow diagram of determining HRTFs using captured images converted into three-dimensional meshes, in accordance with an embodiment.

FIGS. 4 and 5 illustrate determining HRTF of a user using a simulation model 400, in accordance with an embodiment. The simulation model 400 simulates propagation of sound from an audio source at different locations relative to a user's head to determine the user's HRTF. For this purpose, the geometry of a user's head represented in three-dimensional meshes is provided to the simulation model 400. The simulation model 400 produces the simulated HRTF for the user based on the mesh geometry of the user's head.

To obtain the simulated HRTF, the simulation model 400 may use various simulation schemes such as (i) a boundary element method (BEM) described, for example, in Carlos A. Brebbia et al., "Boundary Element Methods in Acoustics," Springer; 1 ed., ISBN 1851666796 (1991) and Gumerov N. A. et al., "A broadband fast multipole accelerated boundary element method for the three dimensional Helmholtz equation," J. Acoust. Soc. Am., vol. 125, issue 1, pp. 191-205 (2009), (ii) a finite element method (FEM) described, for example, in Thompson, L. L., "A review of finite-element methods for time-harmonic acoustics," J. Acoust. Soc. Am., vol. 119, issue 3, pp. 1315-1330 (2006), (iii) a finite-difference time-domain (FDTD) method described, for example, in Taflove, A. et. Al. "Computational Electrodynamics: The Finite-Difference Time-Domain Method," Third Edition; chap. 1,4., Artech House Publishers (2005), and Yee, K., "Numerical solution of initial boundary value problems involving Maxwell's equations in isotropic media," IEEE Transactions on Antennas and Propagation, vol. 14, issue 3, pp. 302-307 (1966), (iv) Fourier Pseudo-Spectral Time Domain (PSTD) method described, for example, in Sakamoto, S. et al. "Numerical analysis of sound propagation in rooms using the finite difference time domain method," J. Acoust. Soc. Am., vol. 120, issue 5, 3008 (2006), and Sakamoto, S. et al. "Calculation of impulse responses and acoustic parameters in a hall by the finite-difference time-domain method," Acoustical Science and Technology, vol. 29, issue 4 (2008), the contents of which are incorporated by reference herein in their entirety.

FIG. 5 is a flow diagram of determining HRTFs using captured images into three-dimensional meshes, in accordance with an embodiment. The processes of FIG. 5 may be performed by the server 120 and/or the HMD 210.

The depth map generator 310 receives 510 images of the user including at least the user's head. The images may be from the DCA 220 of HMD 210 or from an imaging device of a mobile device. The depth map generator 310 generates a depth map indicating positions of the features of a user's head (e.g., ears).

The geometry generation module 330 receives the depth map from the depth map generator 310 and generates 520 the three-dimensional mesh geometry of the user's head. The sound simulation module 340 receives the generated mesh geometry from the geometry generation module 330 and performs 530 a simulation of sound propagation from audio sources at different locations to the user's head. Based on the simulation, the HRTF of the user is determined 540.

HRTF Determination Using PCA-Based Geometry

Figure 6A:
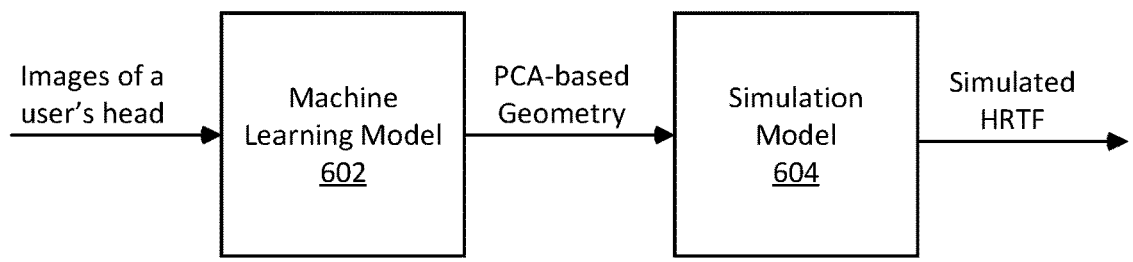
FIG. 6A is a conceptual diagram illustrating generation of a simulated HRTF by converting images of a user's head into a PCA-based geometry, in accordance with an embodiment.

FIG. 6A is a block diagram of a machine learning model, in accordance with an embodiment. First, the images of the user's head are converted into a PCA-based geometry representing the user's head using a machine learning model 602. The machine learning model 602 is trained to produce PCA-based geometry and embodies a PCA model in which a human head or shapes of the human head feature (e.g. ear shapes) is represented as a linear combination of three-dimensional shapes of representative test subjects' heads or head feature.

Taking an example of using PCA analysis on the shape of ears, a three-dimensional shape of a random ear shape E can be represented as follows:

$$E = \Sigma(\alpha i \times \varepsilon i) \quad (1)$$

where $\alpha i$ represents i-th principal component (i.e., three dimensional i-th representative ear shape) and $\varepsilon i$ represents PCA coefficient of the ith principal component. The number of principal components (the number of "i") is selected so that it is smaller than the total number of test subjects provided with the their measured HRTFs. In an example, the number of principal components is 5 to 10.

The PCA model is generated using geometries of test subjects' head shapes and their measured HRTFs, as described below in detail with reference to FIG. 6B, so that the use of PCA-based geometry obtained from the PCA model yields more accurate HRTFs by simulation compared to performing simulation on a three-dimensional mesh geometry of the same user head. After the PCA model is determined, a machine learning model 602 is trained using the images of the test subjects' head (or depth maps derived from the images) and their PCA-based geometries according to the PCA model. The trained machine learning model 602 can predict or infer the PCA-based geometries of a user's head from the images of the user's head (or a depth map derived from the user's images).

The test subjects described herein refer to humans or physical models of humans for which their head shape geometries (or head shape images) and HRTFs are already known. To obtain the HRTFs, the test subjects may be placed in an anechoic chamber and exposed to sounds from different locations within the anechoic chamber with microphones placed at the test subjects' ears.

Such generation of the PCA model and the training of the machine learning model 602 can be performed offline. Then, the trained machine learning model 602 can be deployed in the geometry generation module 330 of the server 300. Using the trained machine learning model 602 enables the geometry generation module 330 to produce PCA-based geometry of a user's in a robust and efficient manner.

Figure 6B:
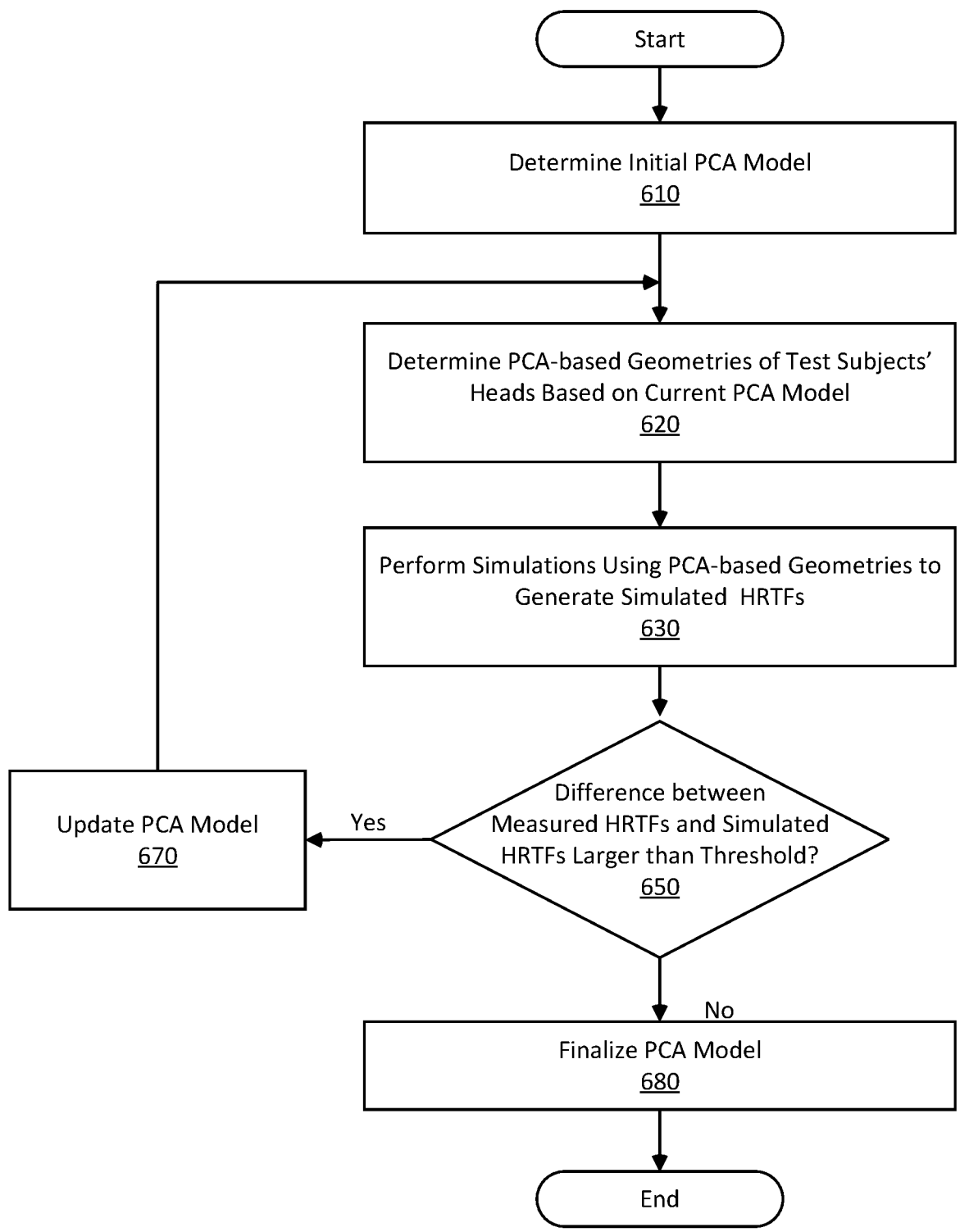
FIG. 6B is a flow diagram of determining a PCA model, in accordance with an embodiment.

FIG. 6B is a flow diagram of determining the PCA model, in accordance with an embodiment. The process of FIG. 6 may be performed by the PCA module 320 of the server 120. Likewise, embodiments may include different and/or additional steps, or perform the steps in different orders.

The PCA module 320 determines 610 an initial PCA model by selecting a subset of the test subjects' head (or a portion thereof) as principal components for representing a random head shape or a feature of the head shape. The images of the test subjects' heads or depth maps derived from the images are processed using the initial PCA model to determine 620 PCA-based geometries of the test subjects' heads or portions of the test subjects' heads (e.g., ears). That is, all test subjects' head shapes (or shapes of portions of the heads) are represented as a linear combination of a subset of test subjects' head shapes multiplied by a corresponding PCA coefficient, as explained above with reference to Equation (1).

Then, simulation is performed 630 on the PCA-based geometries using one or more of BEM, FEM, FDTD method, or PSTD method as described above with reference to FIG. 4. As the result of the simulation, simulated HRTFs of the test subjects based on the current PCA-model are obtained.

Then, it is determined 650 whether the difference between the measured HRTFs and the simulated HRTFs of the test subjects are larger than a threshold. The difference may be a sum of the magnitude of the differences between the measured HRTFs and the simulated HRTFs for each of the test subjects.

If the difference is larger than the threshold, the PCA model is updated 670 to a new current PCA model. The updating of the PCA model may include adding or reducing the number of principal components, updating PCA coefficient values or updating the representative shapes. Then, the process returns to determining 620 new sets of PCA-based geometries based on the updated current model and repeats the subsequent steps.

If it is determined 650 that the difference is less than or equal to the threshold, the current PCA model is finalized 680 as the PCA model for deployment.

Figure 7:
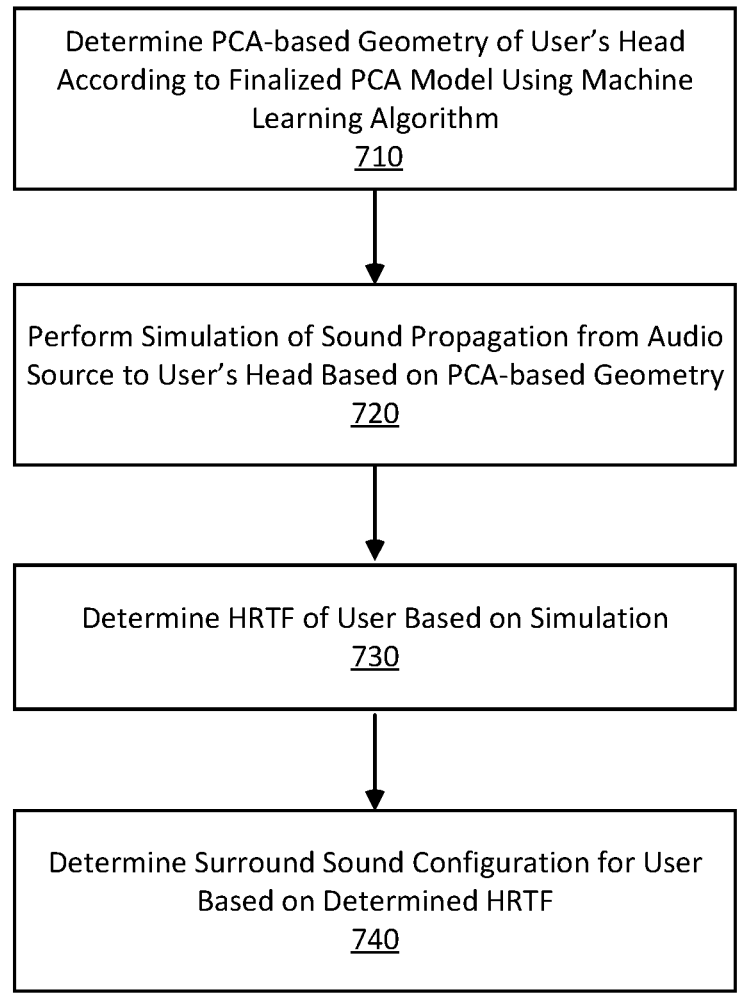
FIG. 7 is a flow diagram of determining HRTFs using PCA-based geometries, in accordance with an embodiment.

FIG. 7 is a flow diagram of determining HRTFs using PCA-based geometries, in accordance with an embodiment. After images or a depth map of the user' head is obtained, PCA-based geometry of the user's head (or a portion thereof) is determined 710 using the machine learning model 602 that embodies the PCA model determined, for example, as described above with reference to FIG. 6B.

A simulation is then performed 720 on the PCA-based geometry of the user's head generated from the machine learning model. The simulation may use one or more of BEM, FEM, FDTD method, or PSTD method as described above with reference to FIG. 4. As a result of the simulation, the HRTF of the user is determined 730. Based on the HRTF obtained from the simulation, a surround sound configuration for the user is determined 740. The surround sound configuration may be used in the audio processing module 360 or the HMD 210 to produce virtual surround sound.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   receiving an image of a user's head;
   generating a geometry of the user's head by processing the received image of the user's head using a machine learning algorithm, the geometry represented using a principal component analysis (PCA) model describing the user's head as a combination of representative three-dimensional shapes of test subjects' heads;
   performing a simulation of sound propagation from an audio source to the user's head based on the generated geometry; and
   determining a head-related transfer function (HRTF) for the user based on the simulation.

2. The method of claim 1, wherein the PCA model is generated by:
   receiving head images of the test subjects and measured HRTFs of the test subjects;
   determining PCA-based geometries of the test subjects' heads from the received head images based on an initial PCA model;
   performing simulation on the PCA-based geometries to determine simulated HRTFs of the test subjects;
   determining differences between the simulated HRTFs and the measured HRTFs;
   generating, based on the determined differences, an updated PCA model by modifying the initial PCA model or by updating one or more intermediate PCA models derived from the initial PCA model; and
   determining the updated PCA model as the PCA model for representing the user's head when the determined differences is below a threshold.

3. The method of claim 1, further comprising training the machine learning algorithm using head images of the test subjects and PCA-based geometries of the test subjects' head images according to the PCA model.

4. The method of claim 1, wherein the image of the user's head includes a shape of an ear of the user.

5. The method of claim 1, wherein the image of the user's head is a depth image.

6. The method of claim 5, wherein the image of the user's head is captured by a depth camera assembly of a head-mounted display (HMD).

7. The method of claim 6, further comprising:
   determining a surround sound configuration for the user based on the HRTF of the user; and
   sending the surround sound configuration to the HMD for processing sound signals.

8. The method of claim 1, wherein the geometry is represented as three-dimensional meshes.

9. The method of claim 1, wherein the simulation is based on one of a finite element method (FEM), a boundary element method (BEM), and a finite-difference time-domain (FDTD) method.

10. The method of claim 1, wherein the image of the user's head is a RGB image.

11. A non-transitory computer readable storage medium storing instructions thereon, the instructions when executed by a processor cause the processor to:
    receive an image of a user's head;
    generate a geometry of the user's head by processing the received image of the user's head using a machine learning algorithm, the geometry represented using a principal component analysis (PCA) model describing the user's head as a combination of representative three-dimensional shapes of test subjects' heads;
    perform a simulation of sound propagation from an audio source to the user's head based on the generated geometry; and
    determine a head-related transfer function (HRTF) for the user based on the simulation.

12. The non-transitory computer readable storage medium of claim 11, wherein the PCA model is generated by:
    receiving head images of the test subjects and measured HRTFs of the test subjects;
    determining PCA-based geometries of the test subjects' heads from the received head images based on an initial PCA model;
    performing simulation on the PCA-based geometries to determine simulated HRTFs of the test subjects;
    determining differences between the simulated HRTFs and the measured HRTFs;
    generating, based on the determined differences, an updated PCA model by modifying the initial PCA model or by updating one or more intermediate PCA models derived from the initial PCA model; and
    determining the updated PCA model as the PCA model for representing the user's head when differences between the measured HRTFs and simulated HRTFs based on PCA-based geometries of the updated PCA model are below a threshold.

13. The non-transitory computer readable storage medium of claim 11, wherein the image of the user's head includes a shape of an ear of the user.

14. The non-transitory computer readable storage medium of claim 11, wherein the image of the user's head is a depth image captured by a depth camera assembly of a head-mounted display (HMD).

15. The non-transitory computer readable storage medium of claim 11, further storing instructions causing the processor to:
    determine a surround sound configuration for the user based on the HRTF of the user; and
    send the surround sound configuration to an HMD for processing sound signals.

16. The non-transitory computer readable storage medium of claim 11, the simulation is based on one of a finite element method (FEM), a boundary element method (BEM), and a finite-difference time-domain (FDTD) method.

* * * * *